July 22, 1947.   H. W. GREIDER ET AL   2,424,234
COMPOSITIONS FOR BUILT-UP ROOFING
Filed Aug. 7, 1943   6 Sheets-Sheet 5
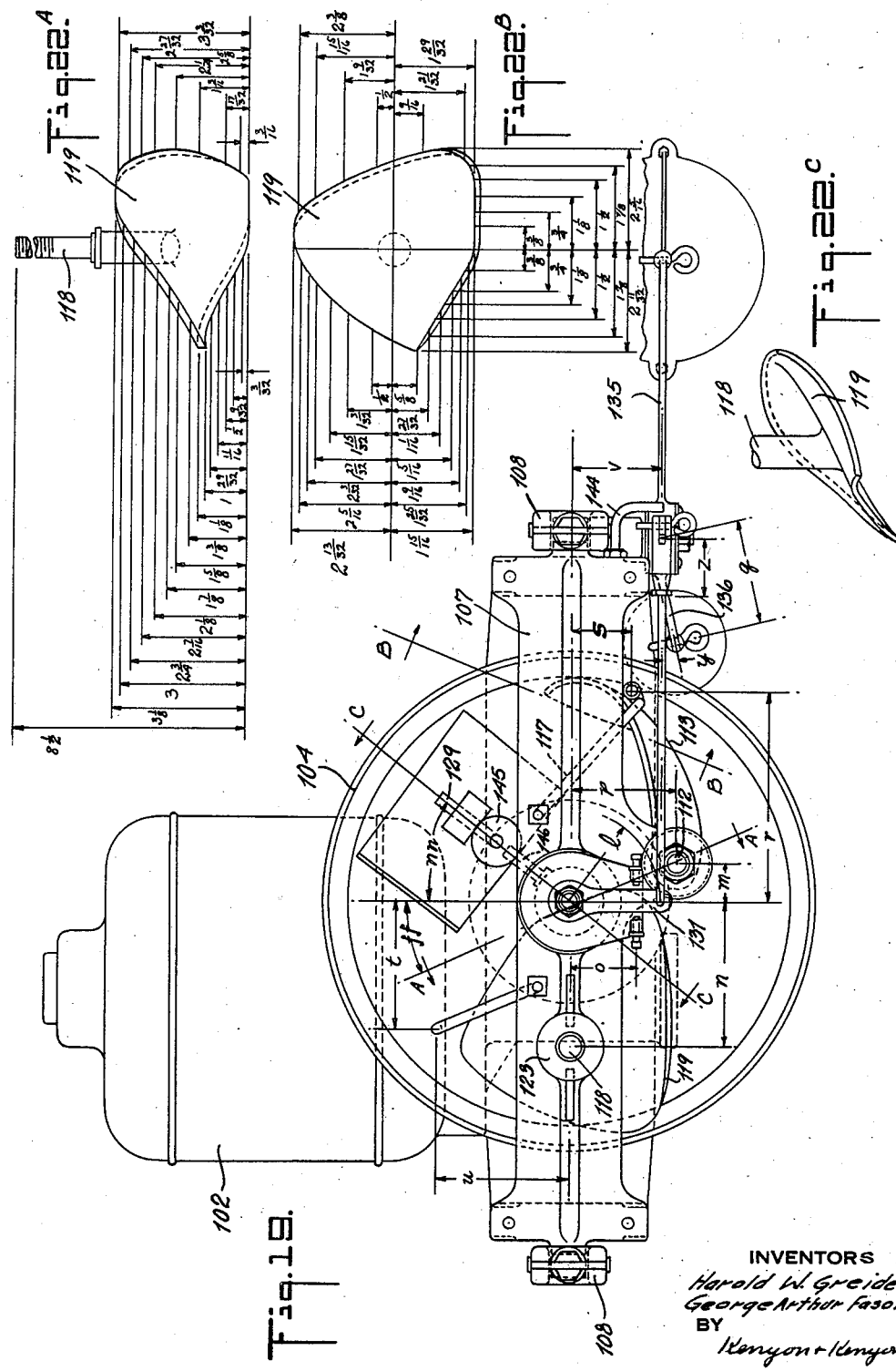
INVENTORS
Harold W. Greider.
George Arthur Fasold
BY
Kenyon & Kenyon
ATTORNEYS

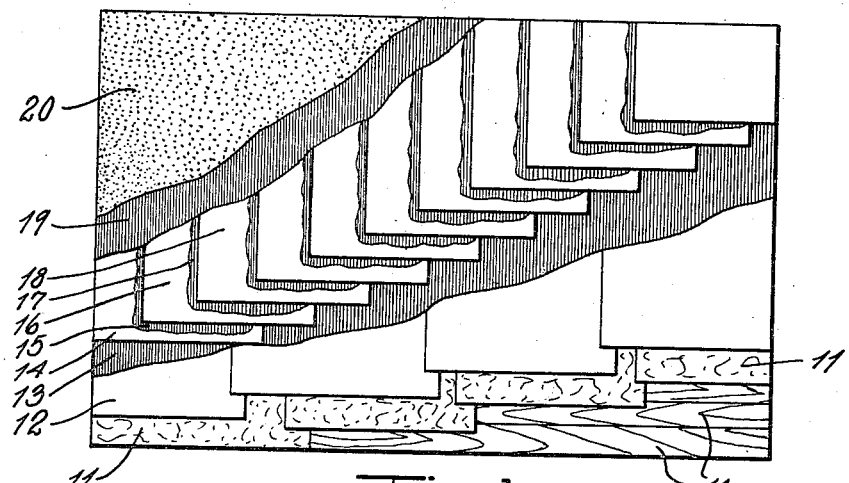
Fig. 1.
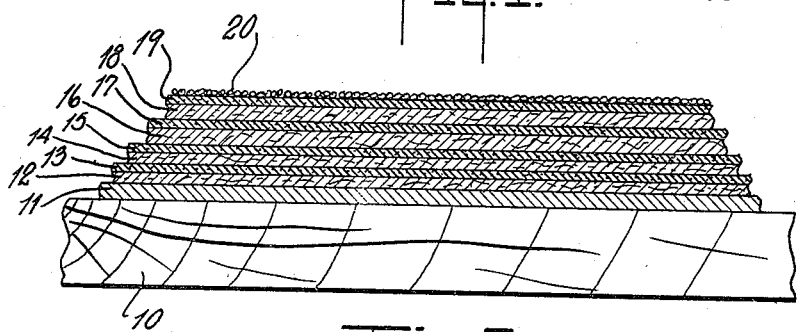
Fig. 2.
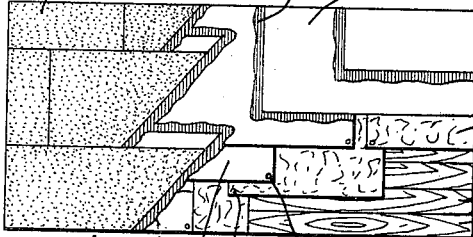
Fig. 3.
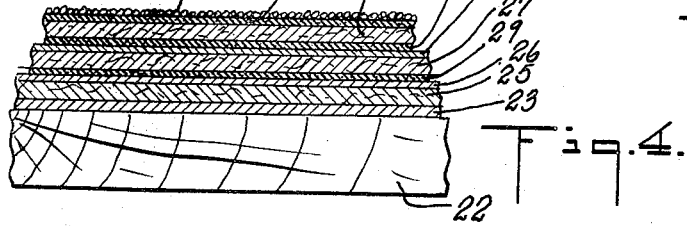
Fig. 4.
Fig. 5.
INVENTORS
Harold W. Greider.
George Arthur Fasold.
BY
Kenyon & Kenyon
ATTORNEYS July 22, 1947.   H. W. GREIDER ET AL   2,424,234
COMPOSITIONS FOR BUILT-UP ROOFING
Filed Aug. 7, 1943   6 Sheets-Sheet 2
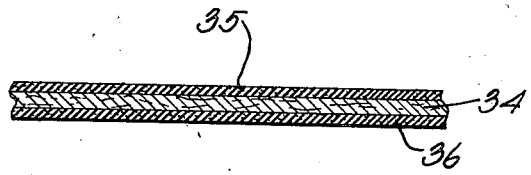
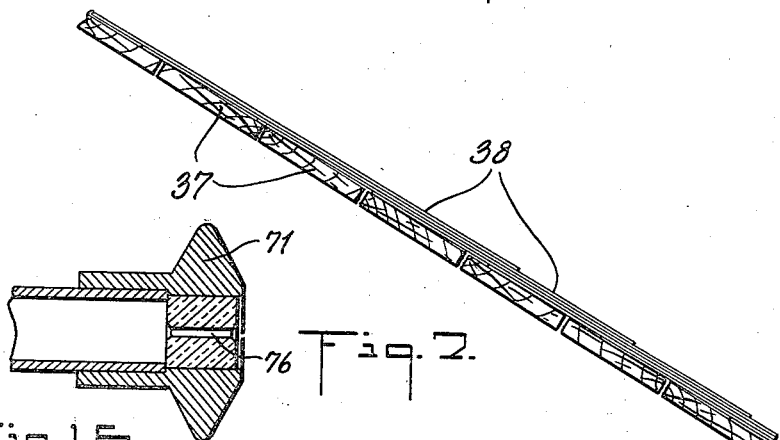
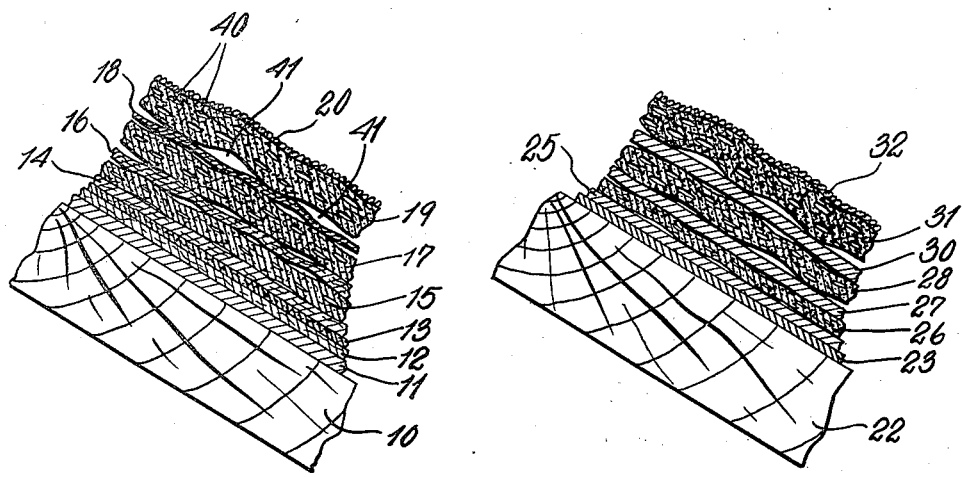
INVENTORS
Harold W. Greider.
George Arthur Fasold.
BY
Kenyon & Kenyon
ATTORNEYS

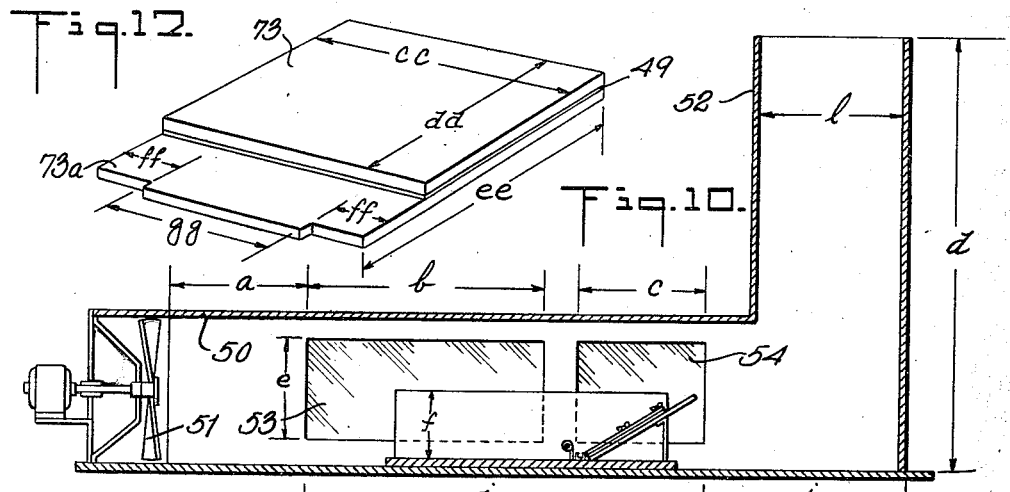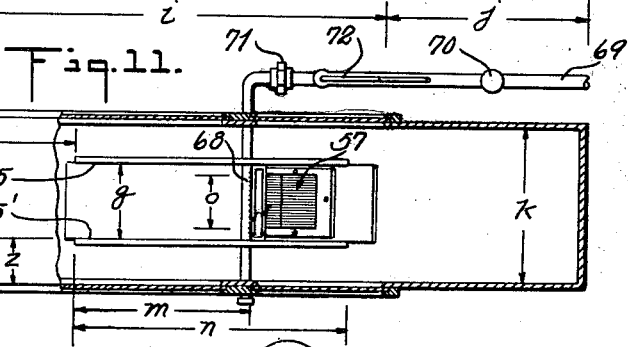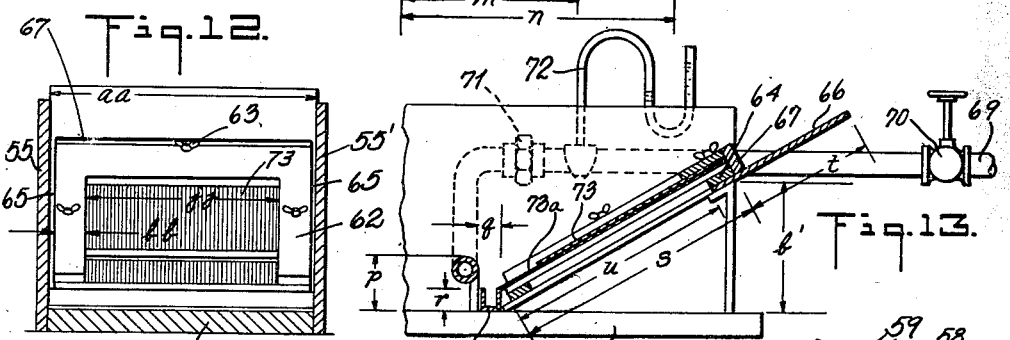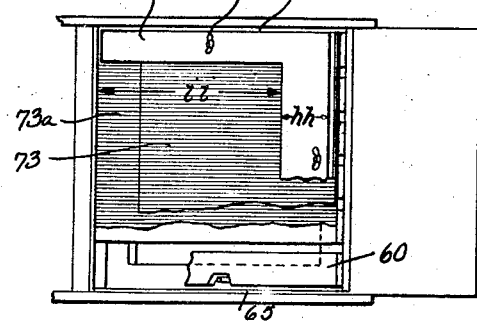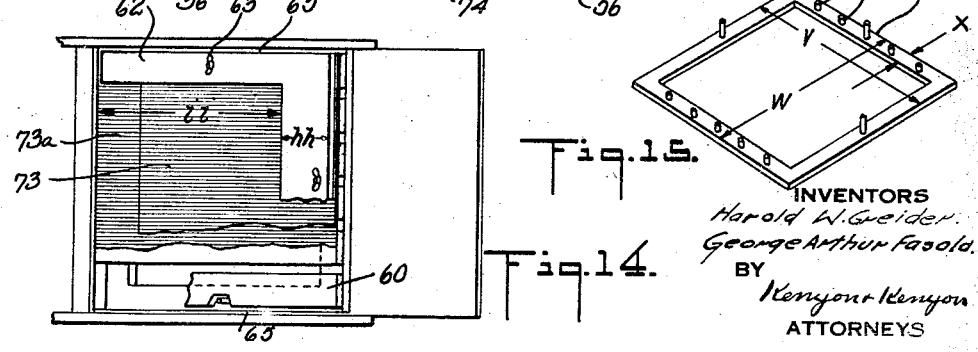

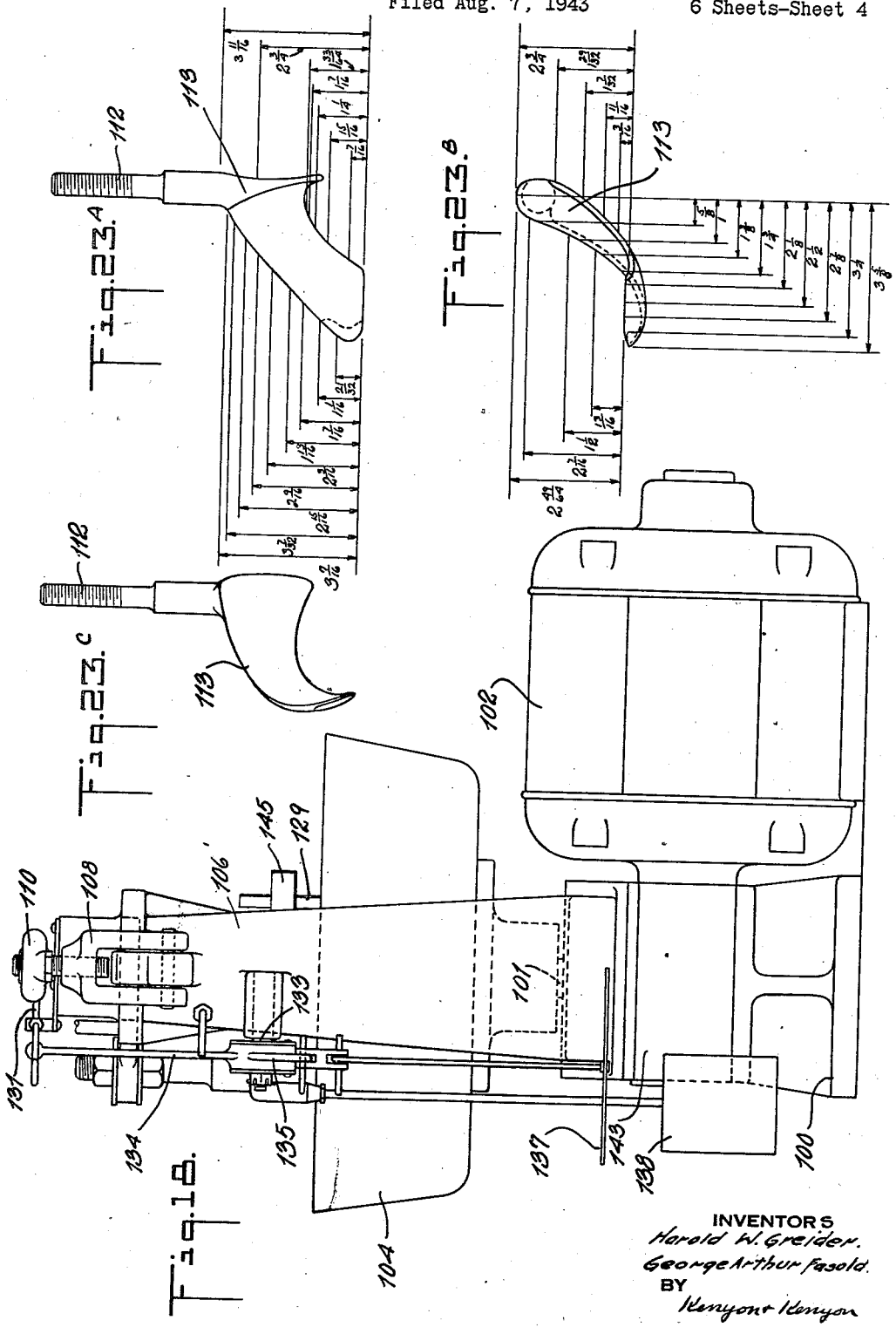

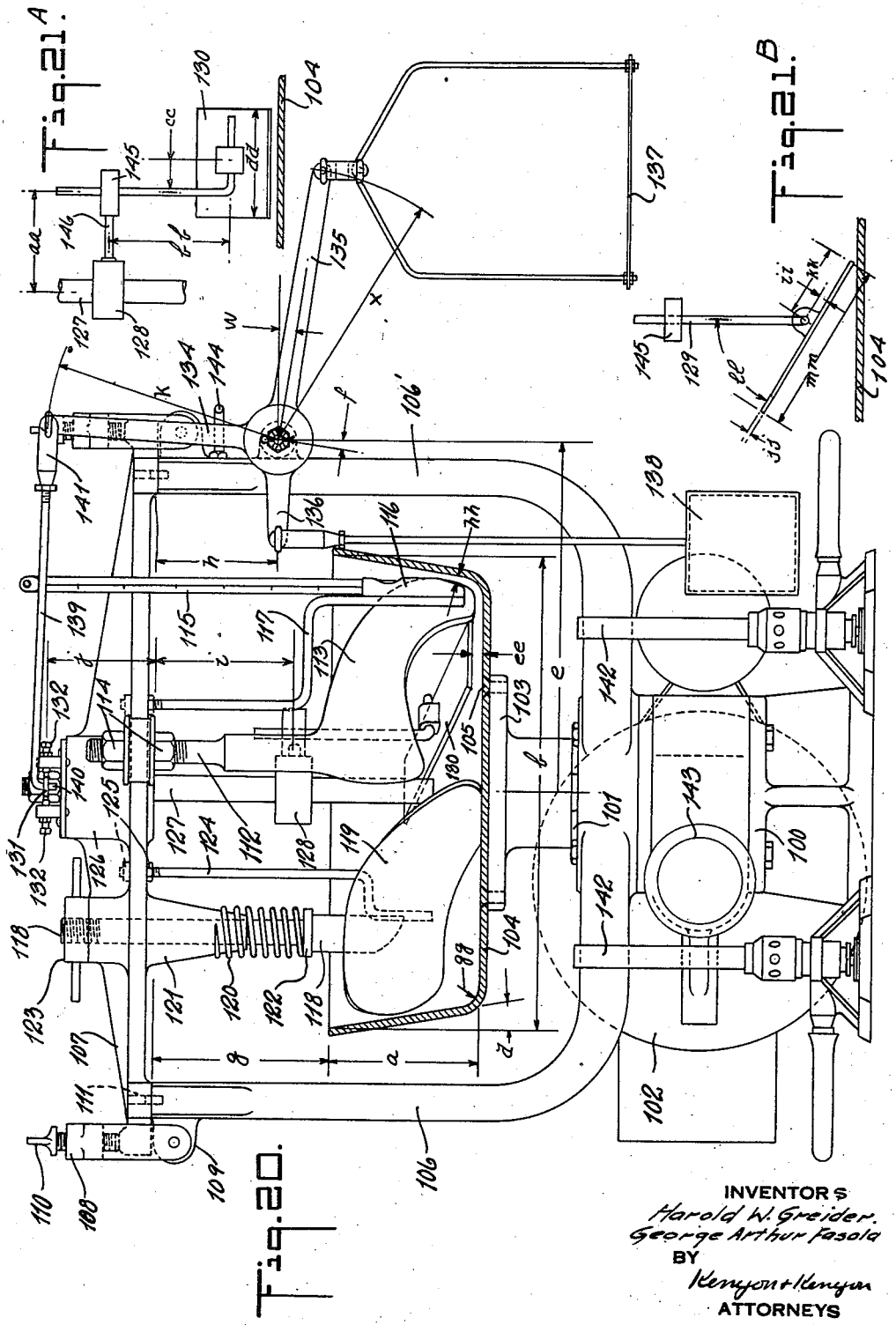

Patented July 22, 1947

2,424,234

UNITED STATES PATENT OFFICE 2,424,234

COMPOSITIONS FOR BUILT-UP ROOFING

Harold W. Greider, Wyoming, and George Arthur Fasold, Mount Healthy, Ohio, assignors to The Philip Carey Manufacturing Company, a corporation of Ohio Application August 7, 1943, Serial No. 497,805

5 Claims. (Cl. 106—282)

1

This invention relates to thermoplastic bituminous compositions of the type adapted to be applied in a heat plasticized condition. It relates particularly to thermoplastic bituminous compositions of the kind that are applied on the job by manual application means in the construction of built-up roofing for the purpose of bonding sheets of felt or the like together with a bituminous waterproofing. Such bituminous compositions are commonly referred to as "mopping asphalt" since it is common practice to apply the asphalt by means of a mop or similar application tool after the asphalt has been brought to a heat liquefied condition.

It is an object of this invention to provide a thermoplastic bituminous composition suitable as mopping asphalt for use in the construction of built-up roofings, which bituminous composition, when used in built-up roofing, will have high fire resistance and will be effective in preventing spread of flame.

The mopping asphalt that is generally used in the manufacture of built-up roofing is a roofing grade asphalt which has a softening point of about 140° F. to 200° F. and which can readily be heat liquefied on the job and spread with a mop or similar implement. Occasionally the mopping asphalt contains a mineral filler such as limestone dust or slate flour in an amount such as 20 to 30% by weight of the composition, but in common practice generally is used without any mineral filler.

Built-up roofings, if made of a sufficient number of plies of sheet material, and particularly if made up using asbestos felt sheet material for the several plies of the roofing, or if surfaced with a large amount of coarse granular slag or gravel, have fairly satisfactory resistance to becoming burned through from the outermost layers to an underlying roof deck when the roofing is exposed to flame. However, built-up roofings heretofore made have relatively low resistance to spread of flame along the surface thereof particularly under the influence of wind. This poor resistance to spread of flame is due largely to the combustibility of the mopping asphalt. Even when the sheet material is composed of asbestos felt and even when the mopping asphalt is used only in layers beneath the top layer of felt, the roofing has poor resistance to spread of flame due to the combustible mopping asphalt bleeding out to the surface and melting and flowing out

2 from between the plies, thus forming areas which burn readily and carry the flame along the surface of the roofing. Moreover, since the mopping asphalt becomes heat liquefied and very thin and non-adhesive upon exposure of the roofing to flame, any wind is apt to raise up the plies of sheet material and when this happens and the air is taken into the body of the roofing, the mopping asphalt is burned rapidly, and the entire roofing burns very actively and soon ignites the underlying roof deck.

According to this invention a bituminous composition is provided which, while liquefiable so that it can be spread and applied with manually manipulated mopping devices, possess high fire resistance properties when a built-up roofing containing it is exposed to flame.

It is a feature of the thermoplastic bituminous composition embodying this invention, that when it is applied as a mopped layer it contains a skeletal mat-like mass of mineral which not only is of low combustibility but also is effective in preventing flow of bitumen when the composition is exposed to flame temperature and is effective in preventing spread of flame. The result is that a mopped layer of the special mopping asphalt of this invention, when a built-up roofing structure containing the layer is exposed to flame, for the most part remains in place, and carbonizes without substantial spread of flame to form a coherent continuous mat-like residue which has high heat insulating characteristics and greatly reduces the degree to which an underlying combustible surface is subjected to the heat of the flame.

When a filler material such as slate flour or limestone dust is incorporated in a mopping asphalt in an amount such as 20% to 30% by weight of the mopping asphalt composition, the filler has virtually no effect at all in increasing the fire resistance of the mopping asphalt. In such case the mopping asphalt burns and flows in essentially the same manner as if the asphalt were used straight and without any filler at all contained therein. By greatly increasing the amount of such filler in proportion to the asphalt, the composition can be made so as to be of reduced combustibility, but when such condition is reached the mass is so heavy even at elevated temperatures that the mass is wholly unsuited for use as a mopping asphalt.

We have found, however, that different filler materials differ in the property which we have termed "flow resistance coefficient." This property which we have termed "flow resistance coefficient" is a definite physical property of a filler material which defines the extent to which it modifies the behavior of a bitumen containing the filler incorporated therein, that has been liquefied by subjecting the bitumen to temperatures at or approaching flame temperature. The effect of certain substances in elevating or lowering the boiling point of a liquid is well known, and while the flow resistance coefficient of a filler material in modifying heat liquefied bitumen is an essentially different type of phenomenon, the property of a filler material in having a high or low flow resistance coefficient is an equally definite physical property of a mineral filler which property is determinable in the manner that will be described more in detail herein below.

We have found that by the employment of a mineral filler material having a high flow resistance coefficient it is possible to stabilize the bitumen in a bituminous composition when exposed to flame temperature even though the composition is workable and spreadable when heated and applied in the ordinary way. One would expect that if the bituminous composition is heated to a temperature in the neighborhood of 400° F. as is commonly done in the application of mopping asphalt so that it can be readily applied to a roof covering by means of a mop, the composition would have little stability when heated to considerably higher temperatures such as are incident to exposure to the heat of a flame. However, we have found that this is not the case, and that by use of a filler having a high flow resistance coefficient, the composition, while workable and spreadable by mopping at usual mopping temperatures, is of such character that if applied to an inclined roof deck (e. g. having a 30 degree inclination to the horizontal) it tends to remain in place and become carbonized to form the coherent mat-like protective mass having the characteristics above mentioned.

Even those mineral filler materials which have a high flow resistance coefficient have little effect in stabilizing a bitumen that is exposed to flame temperatures when used in amounts below the critical amount for the filler material in question. In other words, upon addition of filler material to bitumen there is, even in the case of a filler that is capable of affording a high flow resistance coefficient, little, if any, effect in stabilizing the bitumen when the bitumen is heated to flame temperatures, up to a critical amount in the bituminous composition at which even small further additions of the mineral filler effect very great increase in flow resistance and stabilization of the bitumen when the bitumen is exposed to flame temperature. There is, however, a definite limit as to the extent to which the flow resistance may be increased which limit is imposed by the plasticity value of the composition at temperatures of about 400° F. For the purpose of more precisely defining this invention we have presented hereinbelow means for accurately measuring this plasticity value. We have found that there is a narrow range imposed on the one hand by the requisite flow resistance of the mineral filler and, on the other hand, by the plasticity value within which mopping asphalts may be formulated that can be satisfactorily applied on the job and that, when applied are, free from the fire hazard of ordinary mopping asphalt.

While it is not necessary to employ asbestiform mineral fiber in the practice of this invention we have found that asbestiform mineral fiber has much higher flow resistance value than non-fibrous filler materials. For this reason it is preferred in the practice of this invention to incorporate asbestiform mineral fiber in the mopping asphalt composition of this invention. The asbestiform mineral fiber that is employed is different from that which has been classed as fiber by the Quebec Asbestos Producers Association and which is used for spinning, insulations, papermaking and the like. The asbestiform mineral fiber which we employ is an asbestos dust of fine particle size which asbestos dust is produced as a by-product in the milling of the commercial grades of asbestos fiber and generally heretofore has been disposed of by placing on the dump in enormous quantities at asbestos mines, as a waste product without commercial value.

While asbestiform mineral fibers are preferably employed in the practice of this invention there are limits as to the extent to which said fibers can be used even when the fiber is in dust form for excessive fiber tends to make the mass unworkable. Moreover, the presence of some non-fibrous filler material or the presence of fibrous material of such minute size that it virtually loses the effects on the bitumen characteristic of fibrous filler, is essential in order that proper proportions of filler to bitumen may be maintained in a composition that does not exceed the plasticity limit at application temperatures. Such fine mineral fillers also tend to increase the impermeability and strength of the composition at flame temperature and thereby tend to reduce the escape of vapors that induce flame spread.

The foregoing critical limits which have been described in a general way will be described more in detail hereinbelow and in order to afford a better understanding of this invention we will describe our invention in connection with certain illustrative examples of the practice thereof.

A typical example of a bituminous composition prepared in accordance with this invention is given below. In this example and elsewhere herein the percentages given are percentages by weight. In the example given below the screen grading of asbestos dust passing a 6 mesh testing sieve and retained on an 8 mesh testing sieve is indicated for purposes of brevity as (−6+8). Other screen gradings are indicated similarly.

|  | Per cent |
|---|---|
| Asphalt (softening point 124° F.) | 50 |
| Kaolin clay (mostly −200) | 30 |
| Asbestos dust gradings: |  |
| (−6+8) | .01 |
| (−8+10) | .04 |
| (−10+14) | .1 |
| (−14+20) | .75 |
| (−20+28) | 1.0 |
| (−28+35) | 1.6 |
| (−35+48) | 1.2 |
| (−48+65) | 1.8 |
| (−65+100) | 3.5 |
| (−100+150) | 2.0 |
| (−150+200) | 3.0 |
| (−200) | 5.0 |
| Total asbestos dust | 20 |

In connection with the following more detailed description of this invention, reference is made to the accompanying drawings showing the special mopping asphalt as embodied in typical built-up roofings and showing test apparatus for accurately measuring the definitive characteristics of the mopping asphalt, wherein Fig. 1 is a plan view, with portions broken away, of a typical built-up roofing utilizing and embodying the special mopping asphalt;

Fig. 2 is a sectional elevation of a portion of the built-up roofing shown in Fig. 1;

Fig. 3 is a plan view of an alternative type of built-up roofing utilizing and embodying the special mopping asphalt;

Fig. 4 is a sectional elevation of a portion of the built-up roofing shown in Fig. 3;

Fig. 5 is a sectional elevation of a portion of a preformed coated sheet which may be used in preferred built-up roofing constructions;

Fig. 6 is a sectional elevation of an alternative preformed coated sheet which may be used in preferred built-up constructions;

Fig. 7 is a side elevation of plies of built-up roofing mounted on an inclined roof deck for the purpose of making fire retardant tests of the kind specified by Underwriters Laboratories, Inc.;

Fig. 8 is a side elevation of a portion of a built-up roofing utilizing the special mopping asphalt of this invention and of the type shown in Figs. 1 and 2 and showing the appearance of the roofing after exposure to fire;

Fig. 9 is a side elevation similar to Fig. 8 showing the appearance after exposure to fire of a built-up roofing of the type shown in Figs. 3 and 4;

Fig. 10 is a side elevation, partly in section, of a testing device for measuring the flow resistance coefficient of filler material contained in mopping asphalt;

Fig. 11 is a plan view partly in section of the testing device;

Fig. 12 is a front elevation of the test panel assembly;

Fig. 13 is a side elevation partly in section of the test panel assembly;

Fig. 14 is a plan view of the test panel assembly with parts thereof broken away;

Fig. 15 is a perspective view of the frame used in the test panel assembly;

Fig. 16 is a longitudinal sectional detail view on an enlarged scale of the orifice in the gas line leading to the burner of the testing device;

Fig. 17 is a perspective view of the make up of the sample subjected to test by the testing device;

Fig. 18 is an end elevation of the Wagner-Bowen plasticimeter testing device;

Fig. 19 is a plan view of the plasticimeter;

Fig. 20 is a front elevation partly in section of the plasticimeter;

Figs. 21A and 21B are elevations of the drag tool and drag tool support taken respectively normal to the line C—C of Fig. 19 and from the front in the direction of the line C—C of Fig. 19;

Fig. 22A, Fig. 22B, and Fig. 22C are views of the smoothing blade of the plasticimeter taken respectively in elevation normal to the line A—A of Fig. 19, from the bottom, and in elevation from the back in the direction of the line A—A of Fig. 19;

Fig. 23A, Fig. 23B, and Fig. 23C are views of the mixing blade of the plasticimeter taken respectively in elevation normal to the line B—B of Fig. 19, from the bottom, and in elevation from the back in the direction of the line B—B of Fig. 19.

Referring to Figs. 1 and 2, a built-up roof covering is applied to the boards 10 of a roof deck.

Overlying the boards 10 is a single thickness of red rosin paper 11 or the like which is secured by nails (not shown). A single thickness of asphalt impregnated felt 12 overlies the red rosin paper 11 and is also secured in place by nails (not shown). A layer 13 of the special mopping asphalt is applied hot to the felt layer 12 and another layer of felt 14 is made adherent to the mopping asphalt layer 13. This is followed by another layer 15 of mopping asphalt, a layer 16 of felt, a layer 17 of mopping asphalt, and a layer 18 of felt. In the embodiment shown in Figs. 1 and 2, a layer 19 of the special mopping asphalt is applied to the upper side of the felt layer 18, and a suitable surfacing 20 such as rock granules, crushed slag or the like is partially embedded in the super surface of the layer 19 while this layer is still warm enough to be tacky and adhesive. The felt that is used may be ordinary organic fiber felt weighing dry about 5 to about 10 pounds per 100 square feet and saturated to the extent of about 140% to about 185% of the weight of the fibers with a bituminous saturant having, for example, a softening point of the order of 120° F. to 160° F. Alternatively the felt may be asbestos felt weighing dry about 8 to about 20 pounds per 100 square feet and saturated to the extent of about 40% to about 65% of the weight of the fiber with a bituminous saturant of the type just mentioned.

In the embodiment shown in Figs. 1 and 2, the built-up roofing is shown with the special mopping asphalt layer 19 applied for weather exposure and having granules 20 embedded therein. This need not necessarily be the case. Thus the granular surfacing may be omitted. Moreover, the felt layer 18 may be composed of saturated asbestos felt and left uncoated on the upper surface or finished with a thin coating of bituminous paint. If the felt used is organic fiber felt the coating 19 may be omitted and the weather exposed surface covered with a bituminous paint. Alternatively the felt layer 18 may be preformed with the layer 19 and granules 20 in the form of a cap sheet, and in such case, while the layer 19 may be formulated so as to be according to the special mopping asphalt of this invention, it is also possible and in certain cases preferable to employ as the layer 19 a coating composition of the kind described in our application Ser. No. 370,636 filed Dec. 18, 1940 (Patent No. 2,326,723), or in our application Ser. No. 399,024, filed June 20, 1941 (Patent No. 2,326,724) which applications are directed to special fire and blister resistant bituminous roofings.

Referring to the embodiment of Figs. 3, 4 and 5, a preferred type of built-up roofing is shown wherein each of the layers of saturated felt has preformed therewith a layer of fire resistant bituminous composition, the plies of the built-up roofing being cemented together by the special mopping asphalt of this invention. The built-up roofing is laid over the boards 22 of the roof deck. A single layer of red rosin paper 23 or the like is secured to the boards 22 by nails 24 and a single layer 25 of asphalt saturated felt of any of the types referred to in connection with Figs. 1 and 2 is secured in place over the red rosin paper by nails 42. This felt layer 25 has preformed therewith a layer 26 of fire resistant and blister resistant bituminous composition, which is preferably of the kind described in our aforesaid Patents Nos. 2,326,723 and 2,326,724. The preformed coated felt is shown separately in Fig. 5. Another layer of saturated felt 27 with a layer 28 of fire resistant bituminous composition is bonded to the underlying layer by the layer 29 of the special mopping asphalt of this invention. A preformed cap sheet composed of saturated felt 30, bituminous coating layer 31 and surfacing granules 32 is bonded to the underlying layer by the layer 33 of the special mopping asphalt of this invention. The cap sheet and the underlying composite sheet composed of felt 27 and coating layer 28 may be of the character above described in connection with the felt 25 and coating layer 26 shown in Fig. 5. A built-up construction of the type shown in Figs. 3, 4 and 5 has the advantage of minimizing the amount of mopping asphalt that has to be melted on the job and of assuring greater uniformity of distribution in the layers of fire resistant bituminous composition interposed between the layers of felt.

In Fig. 6 a preformed coated felt is shown consisting of a layer 34 of saturated felt with a coating 35 preformed on one side thereof and a preformed coating 36 on the opposite side, the coatings 35 and 36 being of fire resistant bituminous composition such as that described in our aforesaid Patents Nos. 2,326,723 and 2,326,724. If desired, the exposed surfaces of layers 35 and 36 may be dusted with an anti-stick material such as talc or mica. Using preformed coated felt such as that shown in Fig. 6 disposed in a plurality of adjacent plies in a built-up roofing, satisfactory cementing of the plies can be achieved utilizing a minimum of mopping asphalt.

In Fig. 7 built-up roofing is shown applied to a combustible roof deck, the built-up roofing being applied in the manner prescribed by Underwriters Laboratories, Inc. for testing the fire retardant properties of built-up roofings. No attempt has been made in Fig. 7 to show the individual layers of felt and mopping asphalt contained in the built-up roofing. The deck composed of boards 37 is at an inclination of about 23° to the horizontal and the plies 38 are secured thereto in the following manner. The boards 37 are white pine 7½ x 40 x ¾ inches spaced ¼ inch apart and secured to a suitable support such as a 2 x 4 inch board placed transversely to boards 37 adjacent each end thereof. The full width plies 38 are 36 inches in width and are laid so that throughout the body of the deck there is an 8½ inch exposure thereby providing at least four layer coverage over most of the deck. The first four plies are substantially flush with the bottom of the deck and are respectively, 4, 12½, 21 and 29½ inches in width. The fifth ply which is 36 inches in width is set back two inches from the bottom of the deck and thence to the top of the deck an 8½ inch exposure is provided. The respective plies are nailed at the back by four nails to each ply. The deck is 52 inches long for the burning brand and for the flame exposure tests. It is 13 feet long for the flame spread test. Each ply of sheet material is bonded to underlying sheet material by mopping asphalt.

The fire retardant tests of Underwriters' Laboratories, Inc., for the class "A," class "B," and class "C" ratings are described briefly in our aforesaid Patents Nos. 2,326,723 and 2,326,724, which tests are carried out in testing built-up roofings installed in the manner aforesaid. Of these ratings the class "C" rating is the lowest fire-retardant rating and serves to distinguish roofings having appreciable fire-retardant properties from roofings having little or no fire retardant properties such as untreated wood shingles which, of course, are readily ignited and tend to burn freely. The class "A" rating is the highest rating awarded by Underwriters' Laboratories, Inc. and is reserved for such highly fire retardant roofings as asbestos-cement shingles of the double coverage type. Class "B" is an intermediate rating and is, for example, awarded to single coverage asbestos-cement shingles. So far as we are aware there is no built-up roofing of the smooth surface type such as shown in Figs. 1 to 4 other than the invention described herein that carries, or is entitled to, either the class "A" or class "B" rating, whether the plies of sheet material are composed of organic fiber or are composed of asbestos fiber. There are built-up roofings which carry a higher fire retardant rating which higher rating is achieved by placing over the top of the built-up roofing a very large amount such as 400 pounds or more per 100 square feet of some material such as crushed rock or slag that protects the roofings from flame, but use of such large quantities of crushed rock or slag is undesirable and frequently, as where an inclined roof deck is to be covered with built-up roofing, can not be used at all. By comparison, a built-up roofing of the general construction shown in Figs. 1 to 4 which employs special mopping asphalt that has been described above by way of example will successfully pass all of the class "A" fire retardant tests of Underwriters' Laboratories, Inc. Moreover, for different numbers and arrangements of plies and using possible variations in the formulation of the special mopping asphalts, other built-up roofings within the scope of our invention will successfully pass the class "A" and class "B" fire retardant tests of Underwriters' Laboratories, Inc.

When ordinary mopping asphalt is used in carrying out the fire retardant tests of Underwriters' Laboratories, Inc., the mopping asphalt tends to flow out from between the plies of felt onto the surface exposed to the flame and burns with considerable vigor. Moreover, the wind playing over the test deck tends to lift up the ends of the felt sheets so that the fire gets into the body of the roofing quite rapidly. Such roofings are particularly vulnerable to the flame spread test. This is the case even though the upper surface of the built-up roofing does not carry a waterproofing layer of the mopping asphalt.

By way of contrast, built-up roofing made with the special mopping asphalt of this invention behaves very differently when exposed to fire. In Fig. 8, there is shown somewhat roughly the character of a roofing such as that shown in Figs. 1 and 2 after the roofing has been exposed to flame such as that to which roofing is subjected in carrying out the class "A" fire retardant tests of Underwriters' Laboratories, Inc. During exposure to the flame the bitumen and filler in the special mopping asphalt remain in place due to the fact that the filler provides a stable skeletal mat in the bitumen, so that the bitumen, instead of running out and burning carbonizes and forms with the filler a protecting mat-like layer that not only is highly resistant to combustion but also has high heat insulating effectiveness. Moreover, when a mineral filler such as asbestos dust is present that contains water of constitution liberatable at or adjacent flame temperature small bubbles form in the residual mat-like mass that augment its heat insulating effectiveness. Referring to Fig. 8 it is to be noted that the uppermost layer 19 of special mopping asphalt has become considerably expanded and contains a number of pores 40. The layers 18 of felt may be carbonized and to a considerable degree may have disappeared, if the felt used is organic felt, leaving air pockets 41. The underlying layers of the special mopping asphalt may also be puffed up and carbonized, but carbonized to a considerably less degree. The bottom layer of special mopping asphalt is still less affected and the lowermost layers of felt, red rosin paper and wood, if charred at all, have not become ignited or severely burned. In carrying out the class "A" burning brand test it usually takes about 30 to 45 minutes for the brand to burn out. During this time, the uppermost layer 19 may become red hot but the heat insulating effect of the underlying layers of special mopping asphalt is so great that the underlying combustible deck frequently does not even appear scorched.

The character of a built-up roofing such as that shown in Figs. 3, 4 and 5 after exposure to fire is indicated in Fig. 9. The fire resistant composition of the layer 31 of the cap sheet has become porous and expanded, but remains in place as a porous, heat insulating protective mat. The intermediate layer 28 of fire resistant bituminous composition has become merged with the layer 33 (shown in Figs. 2 and 3 but not shown in Fig. 9) with resultant formation of a thick heat-insulating carbonaceous residue. In a similar way the mopping asphalt of layer 29 has become merged with the layer 26 of fire resistant bituminous composition. The red rosin paper and underlying deck are not seriously affected since they have been protected from the heat of the flame by the overlying layers of fire resistant bituminous compositions.

The high flow resistance of the special mopping asphalt of this invention is due to a combination of factors. On the one hand the filler material serves to prevent the bitumen while under the heat of the flame from running and burning. On the other hand the bitumen during carbonization as held in place by the filler provides a carbonaceous binder that cements the filler material together as a coherent mass that has substantial inherent strength and that prevents the filler from crumbling and becoming displaced upon exposure to fire. The result is that the bituminous composition, instead of increasing the fire hazard, is of such character that it becomes converted upon exposure to flame to a continuous mat-like mass of considerable body and coherence that has very high heat insulating effectiveness and serves as a very effective barrier in protecting the underlying roof deck from the heat of the flame.

The property of a filler material whereby a bitumen heated to adjacent flame temperature becomes stabilized and resistant to flow is a definite physical property of the filler material, that, as aforesaid, is similar to such properties as solubility, effect on boiling point, etc. Moreover, this property is capable of accurate measurement. In order to enable us to more accurately define the highly fire resistant mopping asphalt of this invention, we have devised a test whereby the flow resistance, expressed in terms of a coefficient, of a particular filler or filler mixture may be measured under conditions of actual exposure to fire. The determination is made by directing a flame against an inclined test sample that contains the asphalt-filler mopping asphalt, under precisely controlled conditions determined by the construction and operation of the testing apparatus. The following is a description of the controlled conditions under which the determination is made, reference being made to the accompanying drawings Figs. 10 to 17.

The sample to be tested is prepared using asbestos felt which weighs, dry weight, about 10 pounds per 100 square feet and which is saturated to the extent of about 45% on the weight of the fiber with an asphaltic saturant having a softening point of about 125° F. The sample is made up as shown in Fig. 17 and consists of a top ply 73 and a bottom ply 73a. Between the plies 73 and 73a the layer 49 of the mopping asphalt is placed, which should have a caliper of .030"–.045" and should weigh 20 pounds plus or minus 5 pounds per 100 square feet depending upon the proportion and kind or filler used in the mopping asphalt. The mopping asphalt does not extend onto the portion of ply 73a which is not covered by the ply 73. The grain of the felt of each ply extends in the direction of the dimensions $dd$ and $ee$. The dimensions of the sample as indicated on Fig. 17 are as follows:

| | Inches |
|---|---|
| $cc$ | 12 |
| $dd$ | 9¾ |
| $ee$ | 12 |
| $ff$ | 2⅜ |
| $gg$ | 7¼ |

The test is made in a wind tunnel 50 having a fan 51 at one end and a stack 52 at the other end. The tunnel is made of ¼ inch thick asbestos-cement lumber and has two windows 53 and 54 therein which can be opened and closed by any suitable means (not shown).

Within the tunnel are the burner and testing deck which are located between two shields 55 and 55¹ of the asbestos-cement lumber spaced 12¼ inches apart, and which are rigidly mounted on the asbestos-cement slab 56. The inclined test deck is indicated generally by the reference characters 57 and comprises a lower frame-like member 58 having ¼ inch pegs 59 projecting from the face adjacent the upper and lower margins. Between the pegs, strips 60 of asbestos cement boards 1¾ x 12 x ¼ inches are placed. The prepared test sample is placed on the asbestos cement boards 60. The assembly is held down by an iron frame 62 and held in place by thumb screws 63.

After the test deck has been assembled, it is placed on the inclined support 64 which has an opening in the back underneath the strips 60 and which has side flanges 65 to protect each side of the test panel. The support 64 comprises a baffle 66 to prevent the flame licking around behind the test deck. The support, which is made of iron, is mounted on the asbestos-cement slab 56 which measures 12 x 40 x 1 inches. The parts for carrying the test deck are also made of iron. An iron bar 67, 12 x 1 x ¼ inches is placed across the top edge of the deck to protect the sample at this point.

In front of the test deck is the burner 68 comprising an iron pipe having an inside diameter of .472 inch and an outside diameter of .675 inch, with 17 holes 0.078 inch in diameter and ½ inch apart disposed at an angle that is parallel with the plane of the test deck. The burner is provided with an inlet line 69 controlled by a shut off valve 70. In the line 69 is an orifice 76, 6/64 inch in diameter, that is located in the housing connections 71. Between the valve 70 and the orifice is a manometer 72. By this arrangement, a supply of gas under constant pressure can be obtained, thereby obtaining a steady flame of constant intensity during the test.

At the base of the test deck and between the burner and the deck holder is placed a pan 74, ¾ x 1 x 10 inches, which collects any bituminous coating material that flows from the sample during the exposure to the flame.

The dimensions of the different parts of the testing apparatus shown in the drawings as used by us are as follows:

| | Inches | | Inches |
|---|---|---|---|
| a | .24 | p | 2 |
| b | 38 | q | ¾ |
| b' | 6 | r | 1 |
| c | 18½ | s | 12 |
| d | 72 | t | 7 |
| e | 16½ | u | 10½ |
| f | 10 | v | 12 |
| g | 12¼ | w | 12 |
| h | 38 | x | 1 |
| i | .64 | z | 6 |
| j | 32 | aa | 12 |
| k | .24 | bb | 2⅜ |
| l | 24 | hh | 3½ |
| m | 27 | ii | 8¼ |
| n | 40 | jj | 7 |
| o | 8 | | |

In carrying out the test, the apparatus is first assembled and the burner is lighted so as to provide a pilot flame that is about ½ inch in length when the fan is operating. The windows 53 and 54 are then closed and the room in which the apparatus is placed is arranged so that there will be relatively constant conditions during the test. The temperature and relative humidity of the room should be approximately 80° F. and 40%, respectively. The fan should generate a wind velocity of about 150–155 ft. per minute at the portion of the deck exposed to the flame. The valve 70 is then opened until a flame about 8 to 9 inches long is produced having a temperature of about 1325–1370° F. When the valve 70 is opened to produce such flame, a timing device is started. After the sample has been exposed to the flame for a period of five minutes the flame is turned off. Before the commencement of the test the pan 74 is carefully weighed and at the conclusion of the test is again weighed, the difference in weight being the number of grams of bituminous coating material that has flowed into the pan. The mopping asphalt that has flowed out from underneath ply 73 and that remains on the exposed portion of ply 73a is carefully scraped off and weighed. The mopping asphalt that is thus scraped off plus the mopping asphalt collected in the pan constitutes the "total collected mopping asphalt." Before making the determination the felt material of the sample is weighed before and after application of the mopping asphalt thereto, the difference being the weight of the mopping asphalt throughout the total area 12 x 9¾ inches of the mopping asphalt, and from this is calculated the weight of mopping asphalt in the area 6 x 7 inches that is not covered by the frame 62, namely, the mopping asphalt in the area directly exposed to flame.

The coefficient of flow resistance is computed according to the following expression:

$$100 - \frac{\text{Weight of collected mopping asphalt} \times 100}{\text{Weight of mopping asphalt in exposed area}}$$

For example if the weight of the bituminous coating in the exposed area of the sample was 1000 grams prior to testing and 50 grams of the coating were collected in the pan during the test the coefficient of flow resistance would be $$100 - \frac{50 \times 100}{1000} = 95$$

If no coating composition flows into the pan or onto the exposed portion of the ply 73a then the flow resistance coefficient is 100 which is the maximum attainable.

According to the invention the special mopping asphalt can be formulated so that the flow resistance coefficient will be as high as 100. However, greatly improved fire resistance is obtained according to this invention when the flow resistance coefficient of the filler in the mopping asphalt is 75 or greater although it is better to formulate the mopping asphalt so that the flow resistance coefficient of the filler contained therein will be 90 or greater.

As aforesaid the flow resistance effectiveness of different fillers differs. Moreover, regardless of effectiveness, we have found that very substantial additions of filler material may be incorporated without achieving much increase in the flow resistance coefficient. For example a filler material such as kaolin clay has very little effectiveness when used by itself in amounts below 50% by weight. Upon additions above 50 the flow resistance coefficient is increased but before the flow resistance is increased sufficiently to be effective the consistency becomes excessive. By blending some of the asbestos dust with the kaolin clay, the same phenomenon is exhibited, namely, there is little improvement as far as effect on flow resistance is concerned up to the critical point of composition which point in the case of the typical example above given is somewhat below 50% by weight of total filler so that when there is a total filler content of 50%, the flow resistance coefficient is as high as 100. At the same time the composition is such that it can be heat plasticized and spread by means of a mop or similar implement.

As aforesaid, it is not necessary to employ mineral fiber. Thus a mineral filler such as silica flour, while having little effectiveness at lower percentages, results in a flow resistance coefficient of about 89 while affording a moppable composition when the amount used is about 65% by weight of the mopping asphalt composition. A similar effect and flow resistance coefficient are obtainable using about 65% by weight of talc in the mopping asphalt composition.

It is seen from the foregoing that according to our discoveries there is a critical point at which further addition of mineral filler material results in a sudden and very great increase in flow resistance and further that by utilization of a mineral filler which attains or exceeds the critical point where high flow resistance is achieved without exceeding the plasticity maximum required for a mopping asphalt, a highly fire resistant mopping asphalt is produced. The plasticity value, on the one hand, and the flow resistance coefficient, on the other hand, are different properties and according to this invention the mopping asphalt is produced so as to be above the required minimum flow resistance coefficient without exceeding the maximum plasticity value.

The plasticity value of the mopping asphalt composition is determined at 400° F. and has been determined by us, using a Wagner-Bowen mixing bowl plasticimeter, manufactured by E. E. W. Bowen, Bethesda, Maryland. For testing bituminous compositions of the character mentioned herein we have made certain modifications in this test apparatus. In view of this fact and further in view of the fact that we do not know of any available publication wherein this type of apparatus is described in detail, we have shown in the drawings, Fig. 18 to 23c, the testing apparatus which we have employed and a description of the apparatus and its operation follows. When reference is made herein or in the claims to Wagner-Bowen plasticity value, the plasticity value as determined by this test is intended.

The Wagner-Bowen plasticimeter consists of a suitable base 100 which comprises in housing 143 suitable gear means (not shown) for rotating the vertical shaft 101 by power supplied from the motor 102. The shaft 101 carries for rotation at the upper end thereof the horizontally disposed disc shaped support 103 to the top of which is secured the bowl 104 by means of screws 105. By this arrangement the bowl 104 can be rotated by operation of the motor 102, and any suitable means can be provided for maintaining the rotation of the bowl at a predetermined constant speed.

Emanating from the base 100 are arms 106 and 106' which carry on the upper ends thereof the cross bar 107. At the upper end of each arm 106 and 106' is a yoke 108 which is pivoted to lug 109 and which is provided with a thumb screw 110 in threaded engagement therewith so that by loosening the thumb screw 110 the yoke 108 can be swung outwardly permitting removal of the cross bar 107. At each end of the cross bar 107 is a positioning pin 111 by which the position of the cross bar is determined.

The cross bar 107 carries the means determining the plasticity of material in the bowl 104. Carried at the lower end of shaft 112 is the mixing blade 113, the vertical position of which relative to the bowl 104 is adjustable by nuts 114 which secure the shaft 112 to the cross bar 107. Adjacent the end of the mixing blade 113 is the thermometer 115 carried in a guard 116 attached to bracket 117 which in turn is secured at the upper end to the cross bar 107. Carried by the lower end of the shaft 118 is the smoothing blade 119. The shaft 118 and smoothing blade 119 are urged downwardly by the expansion spring 120 between the annular washer 122 and the sleeve 121 in which the shaft 118 is vertically slidable. The vertical position of the smoothing blade 119 is determined by the thumb screw 123 which rests against the upper end of sleeve 121 and which is in threaded engagement with the upper end of the shaft 118. Also rigidly secured to the cross bar 107 is the rod 124 the lower end of which can be adjusted so as to be a predetermined distance from the bottom of the bowl 104 by nuts 125.

At the center of the cross bar 107 is the bearing 126 for vertical shaft 127 that is mounted for rotation therein at a given vertical position. Rigidly secured to the shaft 127 is the drag tool plate 130 by means of the vertical rod 129 held by collar 145 which in turn is supported by the horizontal rod 146 and the collar 128 that is secured to the shaft 127.

A horizontally disposed stub shaft 133 is fixedly carried by arm 106' and pivotally mounted thereon is the T-shaped scale beam member comprising the vertically extending arm 134 and the arms 135 and 136 extending horizontally on opposite sides of the stub shaft 133. Pivotally secured at the end of the arm 135 is the weight pan 137 and pivotally secured at the end of arm 136 is the counter weight 138 which substantially counterbalances the weight pan about stub shaft 133. Between the end of arm 131 and the end of arm 134 is the tie rod 139. One end of the tie rod 139 has a turned down portion 140 which slips through an opening of corresponding size in the end of arm 131 to provide pivotal movement with respect thereto. The other end of tie rod 139 is in threaded engagement with a yoke member 141 which is pivotally mounted with respect to the upper end of arm 134. If desired a fixed stop arm 144 can be provided for convenience in restraining movement of arm 134 when the tie rod 139 is disengaged from arm 131. The contents of the bowl 104 can be heated as by the gas burners 142.

In the operation of the plasticimeter the bowl 104 is rotated in a clockwise direction and as the bowl continues to operate the mixing blade 113 scrapes the heated contents of the bowl away from the outside bottom portion thereof and the thermometer 115 records the temperature of the contents of the bowl at this point. The contents of the mixing bowl are next carried under the smoothing blade 119 which smooths the contents of the bowl to a predetermined level above the outer portion of the bottom of the bowl. The lower end of the rod 124 serves as a check to determine whether the smoothing blade 119 is smoothing the contents of the mixing bowl to the desired level, and if it is not, the vertical position of the smoothing blade 119 is adjusted by thumb screw 123. The heated contents of the bowl at the predetermined desired level therein are then carried past the drag tool 130 and this tends to rotate the shaft 127 in a clockwise direction and to pull the weight pan 137 upwardly through the system of lever arms and tie rod hereinabove described. The greater the plasticity, i. e., the heavier the consistency, of the contents of the bowl 104 the greater will be the drag on the drag tool 130 that tends to elevate the weight pan 137. By placing weights on the weight pan 137 and while continuing to rotate the bowl 104, the device can be brought into a state of equilibrium so that the end of the arm 131 will be approximately mid-way between stop screws 132—132 and the weight in grams required to achieve this condition of equilibrium for a particular composition contained in the mixing bowl is the Wagner-Bowen plasticity value. This value is dependent upon the dimensions of the apparatus and the manner of use of the apparatus in making the determination. The essential dimensions of the apparatus shown in the drawings are:

| | | | |
|---|---|---|---|
| $a$ | 3⅛ inches | $v$ | 1¹³⁄₁₆ inches |
| $b$ | 9⅝ inches | $w$ | 9° angle |
| $d$ | 8° angle | $x$ | 5⁹⁄₁₆ inch radius |
| $e$ | 7⁷⁄₁₆ inches | $y$ | 11° angle |
| $f$ | 4° angle | $z$ | 1 inch |
| $g$ | 3⅝ inches | $aa$ | 1¹³⁄₁₆ inches |
| $h$ | 2⅜ inches | $bb$ | 2¹⁷⁄₃₂ inches |
| $i$ | 2⅞ inches | $cc$ | ¾ inch |
| $j$ | 2¼ inches | $dd$ | 2½ inches |
| $k$ | 4¾ inch radius | $ee$ | ¼ inch |
| $l$ | 1¹³⁄₁₆ inch radius | $ff$ | 24° 15' angle |
| $m$ | 1³⁄₁₆ inch | $gg$ | ⅝ inch radius |
| $n$ | 2⅞ inches | $hh$ | ⅛ inch |
| $o$ | 1⁵⁄₁₆ inches | $ii$ | ¼ inch |
| $p$ | 2⅛ inches | $jj$ | ³⁄₃₂ inch |
| $q$ | 2¹⁄₃₂ inches | $kk$ | 1½ inches |
| $r$ | 4⅛ inches | $ll$ | 58° angle |
| $s$ | 1¼ inches | $mm$ | 3½ inches |
| $t$ | 2½ inches | $nn$ | 31½ degree angle |
| $u$ | 2⅝ inches | | |

The dimensions of the mixing blade 113 and of the smoothing blade 119 are indicated on the face of the drawings.

The Wagner-Bowen plasticity values at 400° F. given herein are determined in the following way. The height of the lower end of the measuring rod 124 from the bottom of the bowl 104 is adjusted so as to be ⅞ inch. The height of the bottom of the drag tool 130 from the bottom of the bowl is set so as to be ¼ inch. The weight of the composition to be tested is approximately 1500 grams. The weight is not critical provided the thickness of the composition as it leaves the smoothing blade just clears the lower end of the measuring rod 124. The composition is mixed while in the bowl 104. Throughout the test the bowl 104 is rotated at the rate of 60 rotations per minute. The bitumen that is used in the composition while in a heat liquefied condition is poured into the bowl while the bowl is rotating. The bitumen is brought to a temperature of 400° F. by the burners and while maintaining the temperature at 400° F. the filler material is added in small increments until it has all been incorporated. The smoothing blade 119 is then adjusted so that the composition as it leaves the smoothing blade just clears the lower end of the measuring rod 124. Weights are then placed on the weight pan 137 until the arm 131 is brought to a position between the stop screws 132, the weight to bring about this condition of equilibrium being recorded. Such records are made every five minutes until the recorded weight becomes constant for three consecutive readings. The weight in grams for the last three consecutive readings is taken as the Wagner-Bowen plasticity value of the composition at 400° F.

In the formulation of a mopping asphalt the Wagner-Bowen plasticity value should be below 250 grams and preferably should be below 150 grams.

In the practice of this invention the total filler content is of the range 40% to 65% by weight of the mopping asphalt composition, the asphalt being of the range 35% to 60% by weight of the composition. In preferred compositions the total filler is of the range 45% to 60% by weight of the mopping asphalt composition. By employment of mineral fiber such as abestiform mineral fiber as a portion of the mineral filler it is possible to utilize a number of filler materials which if used alone within the range just mentioned are unsuitable or are less suitable than when used with the mineral fiber. This has been brought out in connection with the example of this invention that has been mentioned above which utilizes a mixture of asbestos dust and kaolin clay. Thus a mopping asphalt which contains about 45% of asphalt together with about 30% of slate flour or limestone dust and about 25% of asbestos dust is suitable even though the slate flour or limestone dust are not suitable by themselves. Other diluent filler materials may likewise be used such as fly ash, hydrated Portland cement, land plaster, and calcium silicate hydrate.

Of the non-fibrous mineral filler materials, we prefer to employ kaolinitic clay, since we have found the special mopping asphalt compositions of this invention that contain kaolinitic clay are particularly effective in preventing separation of the plies of built-up roofing when the roofing is exposed to flame temperature. It is therefore desirable that the special mopping asphalt composition of this invention contain at least about 15% and preferably 25% by weight of kaolin clay in the mopping asphalt composition.

The amount of asbestos dust or the equivalent that is used in the practice of our invention depends to a large extent upon the screen analysis of the different screen fractions contained therein, for the different screen fractions of a fibrous mineral such as asbestiform fiber are considerably different in their effectiveness in imparting flow resistance. Thus in the case of chrysotile asbestos dust we have found that when the screen grading (—28+35) is used a composition consisting of 9.4% by weight of such specially graded fiber, 45.6% by weight of slate flour (total filler 55%) and 45% by weight of asphalt having a softening point of about 130° F. has a flow resistance coefficient of about 75. The screen grading (—8+10) is considerably more effective since a flow resistance coefficient of 75 can be achieved by using about 2.5% by weight of mineral fiber together with 52.5% by weight of slate flour (total filler 55%) and 45% by weight of the same asphalt. In other words using the same total amount of filler consisting of fiber plus diluent filler that has little flow resistance effectiveness in amounts less than 55% by weight, the coarse fraction (—8+10) is much more effective than the fraction (—28+35) in affording a given degree of flow resistance. On the other hand, if asbestos fiber (—200) is used it requires about 51% by weight of filler to achieve a flow resistance coefficient of about 75. In view of the differences in effectiveness of the different screen gradings of a mineral fiber such as asbestos dust we have, in order to indicate more definitely the amount of mineral fiber of given screen grading or combination of screen gradings that is required in a suitable mopping asphalt, assigned to the different screen gradings what we have called a "screen factor" for each of the different gradings. Thus if the screen grading (—28+35) of chrysotile asbestos dust is taken as having a screen factor of unity, any screen grading that only requires half the amount to achieve the same flow resistance coefficient as compared with the amount of the grading (—28+35) will be twice as effective and will have a screen factor of 2. On the other hand a screen grading which requires twice the amount as compared with the amount of the grading (—28+35) will only have half the effectiveness and will have a screen factor of 0.5. In like manner screen factors can be assigned to the other screen gradings.

The above described test for determining the flow resistance coefficient of a filler in a bituminous composition affords a convenient basis for setting up the screen factors of the screen gradings of fibrous mineral fillers on a definite scale and when the screen factor of a given screen grading of a fibrous mineral is referred to herein, the screen factor as determined in the following manner is intended. The test for determining the flow resistance coefficient is carried out using the test apparatus and procedure above described. The total filler in all cases is 55% by weight of the bituminous composition and the asphalt in all cases is an oxidized straight run asphalt having a softening point of about 130° F. Slate flour at least 85% by weight of which passes a 200 mesh testing sieve is used in all cases as the standard diluent filler, and the amount by weight of a particular screen grading of fibrous mineral to achieve a flow resistance coefficient of substantially 75 is determined. Each sample is prepared using the materials and construction of the test sample shown in Fig. 17 and described hereinabove. As a standard chrysotile asbestos dust of the grading (—28+35) is taken as having a screen factor of unity and the screen factor for each of the other gradings is calculated to this standard. By way of concrete example, it being the case that substantially 9.4% by weight of the mopping asphalt composition of chyrsotile asbestos dust having the screen grading (—28+35)— the total filler being 55% by weight as aforesaid, is required to afford a flow resistance coefficient of substantially 75, and it also being the case that about 2.5% by weight of the bituminous composition of the screen grading (—8+10) (the total filler being 55%) also affords a flow resistance coefficient of about 75, the screen factor of chrysotile asbestos dust of the screen grading (−8+10) is seen to be about 3.7. By way of further illustration the "screen factors" of the different screen gradings of a typical chrysotile asbestos dust on the basis above mentioned, are as follows:

| Screen Grading | Screen Factor |
|---|---|
| (−6+8) | 9.4 |
| (−8+10) | 3.7 |
| (−10+14) | 2.3 |
| (−14+20) | 1.7 |
| (−20+28) | 1.3 |
| (−28+35) | 1.3 |
| (−35+48) | 1.0 |
| (−48+65) | .8 |
| (−65+100) | .6 |
| (−100+150) | .5 |
| (−150+200) | .3 |
| (−200) | .2 |

It is to be noted that in the case of the fiber of the screen grading (−200), it required almost the total 55% of filler to achieve a flow resistance coefficient of 75 and that the screen factor of .2 has been assigned to this particular grading. Similarly any grading of a different type of fiber which requires about or more than 55% by weight of the mopping asphalt composition to afford a flow resistance coefficient of 75 may be considered as having a screen factor of .2.

The foregoing affords a convenient way of ascertaining the flow resistant effectiveness of a fibrous mineral filler. Given the percentage by weight of each of the screen gradings of mineral filler contained in the mopping asphalt composition, the percentage by weight of each multiplied by the screen factor of each of the screen gradings gives what we term the "grading index" for each screen grading, and, by adding the grading indices of each screen grading together, the grading index for the total mineral fiber is readily determined. By way of illustration the grading index of the mineral fiber component of the above mentioned typical embodiment of mopping asphalt according to this invention is as follows:

| Screen Grading | Percentage by Weight of Composition | Screen Factor | Grading Index |
|---|---|---|---|
| −6+8 | .01 | 9.4 | .1 |
| −8+10 | .04 | 3.7 | .1 |
| −10+14 | .1 | 2.3 | .2 |
| −14+20 | .75 | 1.7 | 1.3 |
| −20+28 | 1.0 | 1.3 | 1.3 |
| −28+35 | 1.6 | 1.0 | 1.6 |
| −35+48 | 1.2 | .8 | 1.0 |
| −48+65 | 1.8 | .6 | 1.1 |
| −65+100 | 3.5 | .5 | 1.8 |
| −100+150 | 2.0 | .3 | .6 |
| −150+200 | 3.0 | .3 | .9 |
| −200 | 5.0 | .2 | 1.0 |
| Total grading index for mineral fiber | | | 11.0 |

In determining the screen fractions or gradings of fibrous or other mineral filler that are referred to herein, 8 inch diameter testing sieves of the W. S. Tyler Company Sieve Series, meeting A. S. T. M. Standard E11–39 for sieves for testing purposes have been used. A quantity of filler to be screened ranging from 200 to 300 grams is placed in the uppermost of a series of testing sieves and subjected to suitable agitation as in a standard W. S. Tyler Company Ro-Top sieve shaking machine for a period of five minutes in order to separate the original filler roughly into fractions retained in the different testing sieves. This operation is repeated if necessary in order to obtain about 100 to 200 grams of the desired screen fraction, which fraction is then individually re-screened for 15 minutes using the Ro-Top sieve shaking machine or its equivalent in order to remove any fines contained therein. The resulting screen fraction is material that has passed the coarser screen and is retained on the finer screen.

When reference is made herein to "screen factor" and "grading index," the reference is made to those values when determined under the specific conditions above specified. When, however, reference is made to the flow resistance coefficient of the filler material in a mopping asphalt composition, the reference is to the flow resistance coefficient of the entire filler content of the composition whatever the amount may be and whatever the character of the bitumen used in the composition may be, the mopping asphalt composition being applied, however, to a sample for testing that is of the construction and asphalt saturated felt material above specified.

It is apparent that in the formulation of a mopping asphalt composition one can, from the screen analysis of a mineral fiber, determine the grading index of the mineral fiber employed and thereby determine the effectiveness of the mineral fiber in the amount used in stabilizing the bitumen in the mopping asphalt composition.

In the formulation of suitable fire resistant mopping asphalt compositions one should not employ an excessive amount of fibrous mineral, the requisite amount being a function of the grading index of the fibrous mineral rather than the percentage by weight of the mineral fiber. We have found that the grading index should not be greater than 25 and preferably is not greater than about 20, for a total filler content of 40% by weight of the mopping asphalt composition and should not be greater than 20 and preferably not greater than 15 for a total filler content of 65% by weight. For total filler contents between 40% by weight and 65% by weight the aforesaid limits as to permitted and preferred grading index vary proportionally. From the point of view of Wagner-Bowen plasticity value, the aforesaid maximum for such value, operates, generally speaking, to control employment of mineral fiber of excessively high grading index, but the foregoing limits as to grading index constitute desirable operating limits in the formulation of a fire resistant mopping asphalt in accordance with the invention. While it is regarded as undesirable in the practice of this invention to include in the mopping asphalt composition more than a small amount of fibrous mineral, any such coarse mineral fiber that may be contained in the mopping asphalt composition is to be regarded as having a screen factor the same as the screen factor of the (−6+8) screen grading of the fibrous mineral in question.

At the other extreme, fibrous mineral can be omitted entirely from the special mopping asphalt composition but it is much to be preferred to employ fibrous mineral such as asbesti-form mineral fiber which has a grading index of at least 11 for mopping asphalt compositions having a total filler content of 40% by weight and of at least 7 for mopping asphalt compositions having a total filler content of 65% by weight. It is still better to employ fibrous mineral having a grading index of at least 13 for mopping asphalt compositions having a total filler content of 40% by weight and of at least 8 for mopping asphalt compositions having a total filler content of 65% by weight. The minimum grading indices just given in connection with total filler contents between 40% by weight and 65% by weight will vary proportionally between the figures given.

As a corollary to the foregoing and from the standpoint of affording a composition having good mopping and spreading characteristics, the fire resistant mopping asphalt compositions of this invention comprise mineral filler passing a 100 mesh testing sieve which constitutes about ⅔ of the total mineral filler and preferably about ¾ of the total mineral filler in the composition.

Of the fibrous minerals we prefer to employ asbestiform mineral fiber of which chrysotile asbestos dust or shorts is regarded as the most suitable. Other asbestiform mineral fibers which may be employed are Canadian picrolite, amosite, anthophyllite, tremolite and actinolite.

Another suitable fibrous material is a comminuted mixture of hydrated Portland cement and asbestos fiber, the hydrated Portland cement having become set with the asbestos fiber distributed therethrough. A convenient source of such material is asbestos-cement roofing scrap. Asbestos-cement roofing scrap usually contains about 20% to 35% by weight of asbestos fiber and 65% of 80% by weight of hydrated Portland cement. Heretofore such scrap has been regarded as unavoidable waste of no commercial value. However, by subjecting the scrap to a disintegrator, such as a hammer mill until the particle size is of the order of that mentioned in connection with asbestos fibers, the resulting mass contains a multiplicity of the short asbestos fibers to which the hydrated Portland cement adheres as nodules and for this reason this material is essentially a fibrous material and is to be regarded as a finely-divided fibrous mineral filler.

Another material which is somewhat similar to asbestos cement in that the material contains mineral fibers together with non-fibrous material, is disintegrated fiber-bearing serpentine rock. Since disintegrated fiber-bearing serpentine rock contains fibrous particles, such disintegrated serpentine rock is regarded as one form of fibrous mineral which is suitable for use in the practice of this invention. However, depending upon the physical structure and fibrous mineral content of the particular serpentine rock that is used, the proportion of fiber contained therein is subject to some variation, but, as pointed out below, this merely has the effect of varying somewhat the screen factors of the various screen gradings of the disintegrated serpentine rock as calculated to chrysotile asbestos dust of the screen grading (—28+35) which has a screen factor of unity. Moreover, disintegrated fiber-bearing serpentine rock is of such character that in order to liberate the fibrous material contained therein it should pass a 20 mesh testing sieve, and, when reference is made herein to disintegrated fiber-bearing serpentine rock, only that serpentine rock which has been disintegrated so that it passes a 20 mesh testing sieve is intended, since the individual particles of coarser gradings are not fibrous in character, but granular (are not fibrous mineral as this term is user herein), and since such coarser gradings are ineffective in producing highly fire resistant mopping asphalt compositions.

Other mineral fibers may likewise be employed such as mineral wool and glass fibers. The term "mineral wool" includes various products obtained by attenuating into fibrous form suitable fused materials such as rock or slag.

With regard to the fibrous mineral fillers other than chrysotile asbestos fiber, it is not necessarily the case that a particular screen grading of, for example, asbestos-cement or serpentine rock, will have the same screen factor as that of chrysotile asbestos. In fact even as between different types of asbestiform mineral fibers there are some variations in this regard. However, utilizing chrysotile asbestos dust of the screen grading (—28+35) as the standard, the screen factor of each of the screen gradings of the different fibrous minerals is determinable in the same way that the screen factor of each of the various screen gradings of chrysotile asbestos fiber is determinable. The amount of such alternative fibrous minerals that is employed should preferably be selected in accordance with the figures as to the grading index that have been mentioned above in connection with asbestiform mineral fibers such as chrysotile asbestos, although the amount in terms of percentage by weight may be considerably different. The foregoing also applies to the screen factors and grading indices of mixtures of fibrous minerals. When a mixture of fibrous minerals is employed it is preferable that all or at least a major proportion of the fibrous mineral be selected from the group consisting of asbestiform mineral fibers, disintegrated asbestos-cement, and disintegrated fiber-bearing serpentine rock.

Of the filler materials above mentioned chrysotile asbestos fiber and Canadian picrolite usually contain about 12% to 15% of water of constitution liberatable at temperatures approaching flame temperatures. The other asbestiform mineral fibers are low in water of constitution. Some of the non-fibrous filler materials likewise contain water of constitution that is liberatable at or adjacent flame temperatures. Thus kaolinitic type clays, powdered serpentine rock, calcium silicate hydrate and hydrated Portland cement contain 10% or more of water of constitution that is liberatable at or below flame temperatures. When the filler material contains water of constitution liberatable at or below flame temperature, the liberation of moisture causes the bituminous composition to develop pores to a greater extent than otherwise when the bituminous composition is exposed to flame temperatures and this is desirable since the pores tend to augment the heat insulating efficiency of the mat-like residue that is formed upon exposure of the bituminous coating composition to flame temperature. It is desirable that the bituminous coating composition have incorporated therein a filler material containing water of constitution which water of constitution is liberatable at or below flame temperature amounts to at least about 5% by weight of the coating composition.

With regard to the bitumen that is employed in the special fire resistant bituminous composition it is usually preferable to employ in the special mopping asphalt compositions an asphalt having a softening point of the range 80° F. to 200° F. although it is regarded as preferable to employ an asphalt having a softening point of about 100° F. to about 150° F. The softening points referred to are determined by the standard ring and ball softening point test. Asphalts derived from Mid-Continent crudes are desirable although other asphalts are suitable such as those obtained from Mexican, Venezuelan, and Colombian crudes. Moreover, other bitumens such as pitches, coal tar and the like may also be used in the practice of this invention. We have found that the flow resistance coefficient of a given amount of filler is usually somewhat higher in the case of a cracked asphalt as compared with other types of asphalt while still retaining desirable application characteristics and for this reason where the mopping asphalt is to be employed primarily in substrata where there is to be little direct exposure to weather the employment of cracked asphalt as all or as the major proportion of the bitumen content of the mopping asphalt composition is regarded as preferable. When, however, the mopping asphalt is to be used for direct exposure to weather it is usually preferable to employ some bituminous or asphaltic material other than a cracked asphalt, as all or as the major proportion of the bitumen content of the mopping asphalt composition.

When reference is made herein to "bitumen," this term is used in reference to asphalt, pitch, tar and the like by itself and unmixed with filler. When, on the other hand reference is made herein to a bituminous material or a bituminous composition or a bituminous layer, reference is made to a material, composition or layer comprising bitumen either with or without filler. Any modifier, e. g., of a resinous or oily character that may be mixed with the bitumen is to be regarded as part of the bitumen content of the composition.

While reference has been made hereinabove to the employment of felt consisting of organic fibers or asbestos fibers, and to the impregnation of felt with a bituminous waterproofing material, it is apparent that any other sheet-like strain-resisting material can be employed in the fabrication of built-up roofings employing the special fire resistant mopping asphalt of this invention. Thus sheets of woven fabric such as canvas or duck may be employed, or sheets of unspun fibrous materials and generally any type of fibrous sheet-like base material, either foraminous or non-foraminous, and impregnated or unimpregnated, may be employed. Moreover, the impregnating material for the fibrous sheet may be bituminous or some other type of binder or waterproofing material.

While this invention has been described in connection with certain illustrative embodiments thereof, it is to be understood that this has been done for the purpose of exemplification. Accordingly the scope of this invention is to be governed by the language of the following claims construed in the light of the foregoing description of our invention.

We claim:

1. A thermoplastic bituminous waterproofing composition suitable for mopping in a heat-plasticized condition in the construction of built-up roofing, said composition comprising bitumen having a softening point between about 80° F. and about 200° F. and of the range 35% to 60% by weight of said composition, and said composition comprising intimately commingled and distributed uniformly throughout finely-divided solid water-insoluble heat-resistant mineral filler which is of the range 40% to 65% by weight of said composition and at least ⅔ by weight of which passes a 100 mesh testing sieve, said composition having a Wagner-Bowen plasticity value at 400° F. not substantially greater than 250 grams and said filler contained in said composition having a flow resistance coefficient of at least 75 when said composition is exposed to flame temperature under the flow resistance test as defined herein.

2. A thermoplastic bituminous waterproofing composition according to claim 1 wherein said finely-divided solid water-insoluble heat-resistant mineral filler contains water of constitution liberatable at or below flame temperatures, which water of constitution constitutes at least 5% by weight of said bituminous composition.

3. A thermoplastic bituminous waterproofing composition suitable for mopping in a heat-plasticized condition in the construction of built-up roofing, said composition comprising bitumen having a softening point between about 80° F. and about 200° F. and of the range 35% to 60% by weight of said composition, and said composition comprising intimately commingled and distributed uniformly throughout finely-divided solid water-insoluble heat-resistant mineral filler of the range 40% to 65% by weight of said composition, said composition having a Wagner-Bowen plasticity value at 400° F. not substantially greater than 250 grams, said filler consisting at least to the extent of about ⅔ of the total weight thereof of particles passing a 100 mesh testing sieve, said filler containing fibrous mineral passing a 6 mesh testing sieve the minimum grading index of which varies proportionally from about 11 to about 7 for total filler content varying respectively from 40% to 65% by weight of the composition and the maximum grading index of which varies proportionally from about 25 to about 20 for total filler content varying respectively from about 40% to about 65% by weight of the composition, and said filler in said composition having a flow resistance coefficient of at least 75 when said composition is exposed to flame temperature under the flow resistance test as defined herein.

4. A thermoplastic bituminous composition according to claim 3 wherein said finely-divided water-insoluble heat-resistant mineral filler contains kaolinitic clay that constitutes at least about 15% by weight of said bituminous composition.

5. A thermoplastic bituminous waterproofing composition according to claim 3 wherein said bitumen has a softening point between about 100° F. and about 150° F. and wherein said filler in said composition has a flow resistance coefficient of at least 90 when said composition is exposed to flame temperature under the flow resistance test as defined herein.

HAROLD W. GREIDER.
GEORGE ARTHUR FASOLD.

REFERENCES CITED

The following references are of record in the file of this patent:

UNITED STATES PATENTS

| Number | Name | Date |
|---|---|---|
| 2,212,122 | Miller | Aug. 20, 1940 |
| 2,326,723 | Fasold et al. | Aug. 10, 1943 |
| 2,326,724 | Fasold et al. | Aug. 10, 1943 |
| 1,045,585 | Moeller | Nov. 26, 1912 |
| 1,751,690 | Faben | Mar. 25, 1930 |
| 1,883,683 | Gardner et al. | Oct. 18, 1932 |
| 1,949,229 | Yeager | Feb. 27, 1934 |
| 2,178,770 | Zaisser | Nov. 7, 1939 |
| 2,157,696 | Greider et al. | May 9, 1939 |
| 2,214,904 | Johnson | Sept. 17, 1940 |
| 732,663 | Stempel | June 30, 1903 |
| 2,317,209 | McCluer et al. | Apr. 20, 1943 |
| 2,158,772 | Beckwith | May 16, 1939 |